US012528925B2

(12) United States Patent
Machida et al.

(10) Patent No.: US 12,528,925 B2
(45) Date of Patent: Jan. 20, 2026

(54) PREPREG AND METHOD FOR PRODUCING PREPREG

(71) Applicant: Toray Industries, Inc., Tokyo (JP)

(72) Inventors: Ginpei Machida, Ehime (JP); Ichiro Taketa, Ehime (JP); Hiroaki Sakata, Ehime (JP)

(73) Assignee: Toray Industries, Inc., Tokyo (JP)

( * ) Notice: Subject to any disclaimer, the term of this patent is extended or adjusted under 35 U.S.C. 154(b) by 203 days.

(21) Appl. No.: 18/036,219

(22) PCT Filed: Nov. 24, 2021

(86) PCT No.: PCT/JP2021/042920
§ 371 (c)(1),
(2) Date: May 10, 2023

(87) PCT Pub. No.: WO2022/113976
PCT Pub. Date: Jun. 2, 2022

(65) Prior Publication Data
US 2023/0407024 A1 Dec. 21, 2023

(30) Foreign Application Priority Data
Nov. 27, 2020 (JP) .............................. 2020-196584

(51) Int. Cl.
| | |
|---|---|
| B32B 5/26 | (2006.01) |
| B32B 5/02 | (2006.01) |
| B32B 37/18 | (2006.01) |
| C08J 5/24 | (2006.01) |
| C08L 63/00 | (2006.01) |

(52) U.S. Cl.
CPC .............. *C08J 5/243* (2021.05); *B32B 5/022* (2013.01); *B32B 5/024* (2013.01); *B32B 5/26* (2013.01); *B32B 37/18* (2013.01); *C08J 5/249* (2021.05); *C08L 63/00* (2013.01); *B32B 2250/20* (2013.01); *B32B 2260/023* (2013.01); *B32B 2260/046* (2013.01); *B32B 2305/073* (2013.01); *B32B 2305/076* (2013.01); *C08J 2363/02* (2013.01); *C08J 2429/04* (2013.01); *C08J 2481/06* (2013.01); *C08L 2312/00* (2013.01)

(58) Field of Classification Search
CPC .......... B32B 5/022; B32B 5/024; B32B 5/24; B32B 5/26; B32B 5/262; B32B 5/263; B32B 5/265; B32B 5/266; B32B 5/275; B32B 7/02; B32B 37/18; B32B 2250/20; B32B 2255/02; B32B 2255/26; B32B 2260/021; B32B 2260/023; B32B 2260/046; B32B 2305/073; B32B 2305/076; B32B 2307/748; C08J 5/243; C08J 5/249; C08J 2363/00; C08J 2363/02; C08J 2481/06; C08L 63/00; C08L 2312/00
See application file for complete search history.

(56) References Cited

U.S. PATENT DOCUMENTS

| | | | |
|---|---|---|---|
| 6,391,436 B1 * | 5/2002 | Xu ........................ | C08G 59/38 |
| | | | 428/297.4 |
| 9,828,477 B2 | 11/2017 | Arai et al. | |
| 2011/0218272 A1 | 9/2011 | Numata et al. | |
| 2013/0316169 A1 * | 11/2013 | Matsuda ................ | B32B 5/145 |
| | | | 428/221 |
| 2015/0252160 A1 | 9/2015 | Teranishi et al. | |
| 2016/0002460 A1 * | 1/2016 | Nomura .............. | C08F 293/005 |
| | | | 524/558 |
| 2016/0039984 A1 | 2/2016 | Fukuda et al. | |
| 2016/0121553 A1 * | 5/2016 | Paesano ................ | B29C 70/541 |
| | | | 264/258 |
| 2017/0165876 A1 | 6/2017 | Goh et al. | |
| 2017/0327719 A1 * | 11/2017 | Hoshi .................... | C09J 163/00 |
| 2021/0171729 A1 | 6/2021 | Eto et al. | |

(Continued)

FOREIGN PATENT DOCUMENTS

| | | |
|---|---|---|
| JP | 2002273821 A | 9/2002 |
| JP | 2003201388 A | 7/2003 |

(Continued)

OTHER PUBLICATIONS

International Search Report and Written Opinion for International Application No. PCT/JP2021/042920, dated Feb. 8, 2022, 8 pages.

(Continued)

*Primary Examiner* — Michael A Tolin
(74) *Attorney, Agent, or Firm* — Buchanan Ingersoll & Rooney PC

(57) ABSTRACT

A prepreg is described having good handleability and a low resin flow, facilitating the work in the process of a molded body and improving the dimensional accuracy of the molded body, where the prepreg includes a fiber substrate; and a resin layer containing a thermosetting resin composition containing at least components [A] (thermosetting resin) and [B] (curing agent of [A]), stacked on one surface of the fiber substrate, wherein the fiber substrate is impregnated with a part of the thermosetting resin composition of the resin layer, the thermosetting resin composition having a complex viscosity $\eta 3^*24$ at 24° C. of 20,000 to 100,000 Pa·s and a complex viscosity $\eta 3^*70$ at 70° C. of 100 to 5,000 Pa·s, and a volatile amount of the thermosetting resin composition is 1 mass % or less when a total mass of the prepreg is 100 mass %.

11 Claims, No Drawings

(56) References Cited

U.S. PATENT DOCUMENTS

2021/0230384 A1     7/2021  Tsuzuki et al.
2021/0371613 A1*  12/2021  Furukawa ............ C08G 59/245

FOREIGN PATENT DOCUMENTS

| JP | 2003238657 A | 8/2003 | |
|---|---|---|---|
| JP | 2006111737 A | 4/2006 | |
| JP | 2007284545 A | 11/2007 | |
| JP | 2012197447 A | 10/2012 | |
| JP | 2013155330 A | 8/2013 | |
| JP | 5733418 B2 | 6/2015 | |
| WO | 9602592 A1 | 2/1996 | |
| WO | WO-0027632 A1 * | 5/2000 | ........... B29C 70/467 |
| WO | 2008146386 A1 | 12/2008 | |
| WO | 2010055811 A1 | 5/2010 | |
| WO | 2014157100 A1 | 10/2014 | |
| WO | 2017094633 A1 | 6/2017 | |
| WO | 2019/181402 A1 | 9/2019 | |
| WO | 2019/225442 A1 | 11/2019 | |

OTHER PUBLICATIONS

Extended European Search Report issued Sep. 24, 2024, by the European Patent Office in corresponding European Patent Application No. 21897948.2-1102. (8 pages).

* cited by examiner

PREPREG AND METHOD FOR PRODUCING PREPREG

CROSS REFERENCE TO RELATED APPLICATIONS

This application is the U.S. National Phase application of PCT/JP2021/042920, filed Nov. 24, 2021, which claims priority to Japanese Patent Application No. 2020-196584, filed Nov. 27, 2020, the disclosures of these applications being incorporated herein by reference in their entireties for all purposes.

FIELD OF THE INVENTION

The present invention relates to a prepreg having excellent handleability and a low resin flow, and a method for producing the prepreg.

BACKGROUND OF THE INVENTION

High structural performance has been required for products such as aircraft structural members, blades of windmills, automobile external plates, and computer applications such as IC trays and housings of notebook computers. A molded body for these products is obtained by pressurizing and heating the prepreg in an autoclave, a press machine, or the like and curing the prepreg. The prepreg is produced by stacking a film-shaped resin material formed of a thermosetting resin composition formed of an epoxy resin or the like on a fiber, and then impregnating the fiber with the thermosetting resin composition by pressurizing and heating. There is also a method for obtaining a molded body by stacking a fiber substrate on a molding die in advance, sandwiching both surfaces with a film-shaped resin material, pressurizing and heating with the molding die, and curing. This method is called resin film infusion (RFI), and a molded body can be obtained in a short time.

Here, in a film-shaped resin material containing a thermosetting resin composition and a prepreg, the viscosity of the thermosetting resin composition is a very important property. For example, when the thermosetting resin composition has a high viscosity at room temperature, the tackiness of the film-shaped resin material is low, and adhesion of the resin to a hand or a workplace is suppressed during handling. The tackiness refers to stickiness and sticking of the film-shaped resin material and the prepreg, and when tackiness is low, the film-shaped resin material and the prepreg are less likely to be sticky and less likely to be stuck.

In addition, when the thermosetting resin composition has a high viscosity during curing of the thermosetting resin composition or molding of the prepreg, that is, at a high temperature, the resin flow can be suppressed, and burrs generated in a cured product or the molded body and loss of the amount of the resin in the molded body can be suppressed. The resin flow refers to a flow of a thermosetting resin composition such as a resin layer contained in a film-shaped resin material or a prepreg, and when the amount of the resin flow is large, the thermosetting resin composition easily spreads to the surroundings.

On the other hand, in the steps of producing a film-shaped resin material and a prepreg, the thermosetting resin composition is required to be adjusted to have a low viscosity. This is because the lower the viscosity of the thermosetting resin composition is, the easier the deformation of the thermosetting resin composition becomes, and the easier the thermosetting resin composition is coated on the release sheet to be a support of the film-shaped resin material. That is, when the thermosetting resin composition is designed to have a high viscosity so that the film-shaped resin material has a low tackiness and a low resin flow (small resin flow), the suitability of the film-shaped resin material and the production process of the prepreg is impaired, and a problem occurs in the production process passability.

Examples of the method for producing a film-shaped resin material include a wet method in which a thermosetting resin composition is dissolved in an organic solvent selected from acetone, methyl ethyl ketone, methanol, and the like to reduce the viscosity, and the resultant is coated on a release sheet, and then the organic solvent is evaporated to obtain a film-shaped resin material, and a hot-melt method in which the viscosity is reduced by heating without using an organic solvent, and the resultant is coated on a release sheet to obtain a film-shaped resin material.

In general, when the film-shaped resin material is produced by the wet method, since a solvent is used, the viscosity of the thermosetting resin composition is easily reduced to a small value, but in a hot-melt method without using a solvent, the viscosity is hardly reduced because only heating is performed. Therefore, in the hot-melt method, a problem that a sheet cannot be formed in a production process of using a high-viscosity thermosetting resin composition as a film-shaped resin material easily occurs, and the production process passability is not good.

Patent Document 1 discloses that excellent processability of a film-shaped resin material in a hot-melt method and excellent handleability in a prepreg are achieved by blending a specific thermosetting resin, a curing agent, or a thermoplastic resin in a thermosetting resin composition. In addition, Patent Document 2 discloses that a fiber substrate is impregnated with a film-shaped resin material, and then a thermosetting resin composition is reacted with light to increase the viscosity, thereby eliminating excessive tackiness of the prepreg.

PATENT DOCUMENTS

Patent Document 1: Japanese Patent Laid-open Publication No. 2003-238657
Patent Document 2: Japanese Patent No. 5733418

SUMMARY OF THE INVENTION

The wet method has problems that it takes time and effort to remove the solvent later, the solvent volatilizes during the production process of the film-shaped resin material, which adversely affects the working environment, and the solvent remains in the film-shaped resin material produced by the wet method, which causes voids of the fiber-reinforced composite material, which is a molded body to be produced later, to deteriorate the mechanical characteristics of the fiber-reinforced composite material. Therefore, there is a demand for production of a film-shaped resin material using a thermosetting resin composition having high viscosity and excellent process passability without using a solvent, and a prepreg using the film-shaped resin material. However, as described above, it is very difficult to produce a film-shaped resin material by a hot-melt method and to obtain a prepreg using the film-shaped resin material.

In the technique disclosed in Patent Document 1, since raw materials to be used in the thermosetting resin composition are limited, versatility is low. In addition, in the technique disclosed in Patent Document 2, only the surface of the prepreg that is exposed to the light has a high viscosity and the suppression of the resin flow during molding is insufficient.

Therefore, the problem to be solved by the present invention is to find a prepreg with low tackiness and low resin flow and a method for producing the prepreg without limitation of using a solvent or a specific raw material of a thermosetting resin composition. In addition, by realizing a prepreg having good handleability and a low resin flow, not only the work in the process of producing a molded body is facilitated, but also the dimensional accuracy of the molded body is improved.

In order to achieve the object, the present invention has the following configurations. That is,
  a prepreg including: a fiber substrate; and a resin layer containing a thermosetting resin composition containing at least components [A] and [B] below, stacked on one surface of the fiber substrate,
  wherein the fiber substrate is impregnated with a part of the thermosetting resin composition of the resin layer,
  when a surface on a resin layer side of the prepreg is a resin surface and a surface on an opposite side is a fiber substrate surface, there is a difference between a tackiness force of the resin surface and a tackiness force of the fiber substrate surface,
  the resin layer contained in the prepreg has a complex viscosity $\eta 3^*24$ at 24° C. of 20,000 to 100,000 Pa·s and a complex viscosity $\eta 3^*70$ at 70° C. of 100 to 5,000 Pa·s, and
  a volatile amount of the thermosetting resin composition is 1 mass % or less when a total mass of the prepreg is 100 mass %.
[A] Thermosetting Resin
[B] Curing Agent of [A]

To solve this problem, the present invention provides the following method for producing a prepreg. That is, there is provided a method for producing a prepreg, the method including: a treatment step of pre-curing a film-shaped resin material obtained by coating a release sheet with a thermosetting resin composition containing at least components [A] and [B], in which in the pre-curing step, a resin film is obtained in which the thermosetting resin composition has a viscosity of complex viscosity at 24° C.: $\eta 2^*24$ of 20,000 to 100,000 Pa·s and complex viscosity at 70° C.: $\eta 12^*70$ of 100 to 5,000 Pa·s, the resin film after the pre-curing step is stacked on one surface of a fiber substrate, and the fiber substrate is impregnated with the thermosetting resin composition on one surface of the fiber substrate.
[A] Thermosetting Resin
[B] Curing Agent of [A]

According to the prepreg and the method for producing the prepreg of the present invention, there are no limitations on the raw materials of the thermosetting resin composition, and it is possible to provide a prepreg and a method for producing the prepreg which have good production process passability, low tackiness at room temperature, and a small resin flow during molding. In addition, by realizing a prepreg having good handleability and a low resin flow, not only the work in the process of producing a molded body is facilitated, but also the dimensional accuracy of the molded body is improved.

DETAILED DESCRIPTION OF EMBODIMENTS OF THE INVENTION

A prepreg of the present invention includes a fiber substrate and a resin layer containing a thermosetting resin composition containing at least a thermosetting resin [A] and a curing material [B] thereof are stacked on one surface of the fiber substrate, wherein the fiber substrate is impregnated with a part of the thermosetting resin composition in the resin layer. A resin layer containing a thermosetting resin composition is thinly stacked on one surface of the fiber substrate, and the resin layer covers one surface of the fiber substrate. The fiber substrate is impregnated with a part of the thermosetting resin composition in the resin layer, and the degree of impregnation of the fiber substrate with the thermosetting resin composition is such that one surface side of the fiber substrate is sufficiently impregnated, and the opposite surface side is not sufficiently impregnated, and the fiber substrate is entirely or partially exposed.

That is, when the surface on the resin layer side of the prepreg is the resin surface and the surface on the opposite side is the fiber substrate surface, the fiber substrate is not completely impregnated up to the outermost surface of the fiber substrate surface, or even if the fiber substrate surface is impregnated, the amount is not sufficient, and thus the fiber substrate is not completely covered with the thermosetting resin composition. The tackiness force of the prepreg is smaller than that before curing of the thermosetting resin composition, and there is a difference between the tackiness force of the resin surface and the tackiness force of the fiber substrate surface. The tackiness force of the resin surface covered with the thermosetting resin composition is high, and the tackiness force of the fiber substrate surface not completely covered with the resin surface is small.

In order to generate a difference in the impregnation amount of the thermosetting resin composition, such a prepreg is obtained by pre-curing the film-shaped resin material of the thermosetting resin composition in advance, stacking a pre-cured resin film in which the complex viscosity of the thermosetting resin composition is increased on one surface of the fiber substrate, and performing one-surface impregnation. When the fiber substrate is impregnated with the film-shaped resin material of the thermosetting resin composition as it is, since the complex viscosity of the thermosetting resin composition is small, both one surface and the opposite surface of the fiber substrate are sufficiently impregnated, and both the surfaces of the fiber substrate are covered with the resin layer. That is, the prepreg of the present invention has a prepreg configuration that cannot be obtained by impregnation with a normal thermosetting resin composition.

Furthermore, in the step of producing a film-shaped resin material, even a thermosetting resin composition having a low viscosity is used by stacking a pre-cured resin film on the fiber substrate before impregnating the prepreg with the resin film, so that a thermosetting resin composition having a high viscosity can be obtained. That is, the process suitability of the hot-melt method in which a thermosetting resin composition having a low viscosity is required is satisfied, and the obtained prepreg can achieve low tackiness and low resin flow.

The resin layer contained in the prepreg has a complex viscosity $\eta 3^*24$ at 24° C. of 20,000 to 100,000 Pa·s and a complex viscosity $\eta 3^*70$ at 70° C. of 100 to 5,000 Pa·s, and the thermosetting resin composition has a volatile amount of 1 mass % or less when the total mass of the prepreg is 100 mass %.

The complex viscosity $\eta 3^*24$ at 24° C. of the resin layer of the prepreg is an important property related to handling and impregnation of the prepreg. The higher the viscosity, the lower the tackiness force and the better the handleability. The complex viscosity $\eta 3^*70$ at 70° C. of the resin layer of the prepreg is a property related to the resin flow of the prepreg. As the viscosity is higher, the resin flow is lower, the flow of the resin composition in the prepreg is smaller, and the dimensional accuracy of the molded body is improved. Both $\eta3*24$ and $\eta3*70$ are smaller than the complex viscosity of the thermosetting resin composition before curing. The volatile amount of 1 mass % or less is a feature of only the prepreg obtained by forming a thermosetting resin composition into a film by a hot-melt method without using a solvent, and further impregnating one surface of the fiber substrate using a pre-cured resin film obtained by removing volatile components from the thermosetting resin composition before impregnating the fiber substrate.

The film-shaped resin material and the prepreg of the present invention are described in detail below.

<Film-Shaped Resin Material and Prepreg>

In the present invention, the thermosetting resin composition is handled in various forms and states from kneading to be impregnated on the prepreg. First, the name of the thermosetting resin composition in each step will be described. The thermosetting resin composition is obtained by kneading the thermosetting resin [A] and the curing agent [B] of [A], and may include resins other than [A] and [B]. The thermosetting resin composition can be formed into a film-like resin material by, for example, coating on a release sheet to form a sheet. In the present invention, a material obtained by coating a release sheet with a thermosetting resin composition is referred to as a "film-shaped resin material with a release sheet", and a sheet-shaped thermosetting resin composition alone is referred to as a "film-shaped resin material". The thermosetting resin composition is coated on the release sheet by the hot-melt method.

The resin composition obtained by pre-curing the obtained film-shaped resin material is referred to as a "pre-cured resin film". The pre-curing means that the thermosetting resin composition is subjected to a heat treatment at a temperature lower than the curing temperature. The pre-curing is adjusted to a predetermined degree of curing by evaluating the degree of curing. The production of the "pre-cured resin film" is performed separately before the production of the prepreg. Further, a thermosetting resin composition obtained by stacking the "pre-cured resin film" on one surface of the fiber substrate, removing the release sheet, and stacking the resin film on the fiber substrate is referred to as a "resin layer". The fiber substrate is impregnated with a part of the thermosetting resin composition of the "resin layer" to constitute prepreg.

The complex viscosity $\eta*$ of the thermosetting resin composition of the present invention varies depending on the degree of curing and the measurement temperature. In each step described above, the complex viscosity $\eta*$ is an important index. The complex viscosity is also called a complex viscosity coefficient, and is obtained from viscoelasticity measurement regarding flow characteristics. A storage elastic modulus G' (elastic term), a loss elastic modulus G" (viscous term), and a complex viscosity $\eta*$ (viscosity term) can be determined by applying cyclic deformation (strain) to the thermosetting resin composition and detecting a stress and a phase difference generated thereby. In the present invention, the characteristics of the complex viscosity $\eta*$ at each measurement temperature are important. Here, the complex viscosity of a kneaded thermosetting resin composition is referred to as "$\eta1*$", the complex viscosity of the pre-cured resin film is referred to as "$\eta2*$", and the complex viscosity of the resin layer of the prepreg is referred to as "$\eta3*$". The measured temperature is added to the end of the notation. The notation of the complex viscosity of the kneaded thermosetting resin composition at 70° C. is "$\eta1*70$".

The complex viscosity at 70° C. of the kneaded thermosetting resin composition, that is, $\eta1*70$, is a viscosity that affects production process passability in the step of converting the kneaded thermosetting resin composition into a film-shaped resin material. The complex viscosity $\eta12*24$ at 24° C. of the pre-cured resin film is a viscosity that is important in the step of stacking the pre-cured resin film to produce a prepreg. The higher the viscosity, the lower the tackiness force and the better the handleability. The complex viscosity $\eta3*24$ at 24° C. of the resin layer of the prepreg is an important viscosity in handling of the prepreg. The higher the viscosity, the lower the tackiness force and the better the handleability. The higher the viscosity, the smaller the amount of a part of the resin layer impregnated into the fiber substrate, and the resin impregnation into the fiber substrate is weakened.

The complex viscosity $\eta12*70$ of the pre-cured resin film at 70° C. and the complex viscosity $\eta13*70$ of the resin layer of the prepreg are viscosities that are important when the pre-cured resin film is stacked and impregnated into the prepreg. The higher the viscosity, the smaller the resin flow. In addition, even at the curing temperature, the amount of impregnation of a part of the resin layer is reduced, the resin impregnation into the fiber substrate is weakened, and the resin composition does not completely cover the fiber substrate. Note that $\eta12*24$ of the pre-cured resin film of the present invention is slightly lower than $\eta13*24$ of the prepreg. Furthermore, the $\eta12*70$ of the pre-cured resin film is slightly lower than the $\eta13*70$ of the prepreg.

In the prepreg of the present invention, a resin layer containing a thermosetting resin composition is stacked on a fiber substrate, and the fiber substrate is impregnated with a part of the thermosetting resin composition in the resin layer. Impregnation is one-surface impregnation in which the fiber substrate is impregnated from one side, and when the surface on the resin layer side of the prepreg is the resin surface and the surface on the opposite side is the fiber substrate surface, the fiber substrate is not completely impregnated up to the outermost surface of the fiber substrate surface, or even if the fiber substrate surface is impregnated, the amount is not sufficient, and thus the fiber substrate is not completely covered with the thermosetting resin composition. The tackiness force of the prepreg is smaller than that before pre-curing of the thermosetting resin composition, and there is a difference between the tackiness force of the resin surface and the tackiness force of the fiber substrate surface. The tackiness force of the resin surface covered with the resin is high, and the tackiness force of the fiber substrate surface not completely covered with the resin surface becomes smaller.

The tackiness and the resin flow of the prepreg of the present invention depend on the viscosity of the resin layer contained in the prepreg. The method for evaluating the viscosity of the resin layer is as follows. First, the prepreg is sandwiched between two release sheets, the resin layer contained in the prepreg is partially separated from the fiber substrate by applying heat and pressure with an iron or the like, and the resin layer contained in the prepreg attached to the release sheet is sampled.

In the measurement of the complex viscosity $\eta3*$, the viscosity of the resin layer contained in the prepreg can be measured by using a dynamic viscoelasticity apparatus ARES-2KFRTN1-FCO-STD (manufactured by TA Instruments). The complex viscosity is determined by using flat parallel plates having a diameter of 40 mm as upper and lower measuring jigs, setting the resin layer contained in the prepreg between the upper and lower jigs so that the distance between the upper and lower jigs is 1 mm, and then measuring the complex viscosity while raising the temperature from 20° C. to 150° C. at a rate of 2° C./min in a torsion mode (measurement frequency: 0.5 Hz). Here, the complex viscosity of the resin layer contained in the prepreg at 24° C. is represented by η3*24, and the complex viscosity at 70° C. is represented by η3*70.

η3*24 is preferably 20,000 to 100,000 Pa·s. When η3*24 is 20,000 Pa·s or more, the tackiness of the prepreg is low, and the resin layer contained in the prepreg hardly adheres to the hand or the workplace when handling the prepreg, so that handleability is preferable. When η3*24 is 100,000 Pa·s or less, impregnation of the resin layer contained in the prepreg into the fiber substrate is improved, which is preferable in that adhesiveness to an object to be stacked is kept high during stacking of the prepreg. It is more preferable that η3*24 is 25,000 to 90,000 Pa·s, and it is still more preferable that η3*24 is 40,000 to 90,000 Pa·s.

Further, η3*70 is preferably 100 to 5,000 Pa·s. When η3*70 is 100 Pa·s or more, the resin flow is reduced, and burrs during molding of the prepreg are suppressed, which is preferable. When η3*70 is 5,000 Pa·s or less, the adhesiveness after molding with a prepreg to be stacked is improved, which is preferable. It is more preferable that η13*70 is 500 to 4,000 Pa·s, and it is still more preferable that η13*70 is 2,000 to 4,000 Pa·s.

In addition, preferable ranges of the complex viscosities η12*24 and η12*70 of the pre-cured resin film are close to η13*24 and η13*70, η12*24 is preferably 20,000 to 100,000 Pa·s, and η12*70 is preferably 100 to 5,000 Pa·s. One surface impregnation can be performed by controlling the complex viscosity η12*24 of the pre-cured resin film to be considerably higher than the complex viscosity η11*24 of the thermosetting resin composition (kneading).

The prepreg in the present invention can be molded by stacking one or more prepregs or different materials. The prepreg or the laminate using the prepreg can be obtained by autoclave molding, press molding, oven curing or the like to obtain a molded body (referred to as a fiber-reinforced composite material).

The volatile amount of the prepreg in the present invention is less than 1 mass %, and it is possible to suppress the influence of releasing a chemical substance to the environment in which the prepreg is handled. In addition, since the resin flow of the prepreg in the present invention is as small as less than 10 mass %, the content ratio between the resin and the fiber substrate in the molded body and the cured thickness can be made as intended, and the molded body has fewer burrs, so that there is an advantage that the trimming treatment of the burrs is facilitated.

The basis weight of the film-shaped resin material according to the present invention is preferably 10 to 300 g/m². When the basis weight of the film-shaped resin material is 10 g/m² or more, reinforcing fibers can be sufficiently impregnated with the film-shaped resin material, and mechanical characteristics such as compression and tensile properties of the fiber-reinforced composite material can be sufficiently exhibited, and in order to obtain a predetermined thickness during molding of the fiber-reinforced composite material, the number of stacked prepregs can be reduced, which is preferable because of excellent work efficiency. When the basis weight of the resin film is 300 g/m² or less, heat generation due to curing of the thermosetting resin composition is suppressed when the resin film is molded as prepreg, and the drapability of the prepreg tends to be good, which is preferable. The drapability refers to flexibility of deformation of the prepreg, and is a characteristic that affects shapeability into a mold at the time of stacking. When the drapability is low, it is difficult to shape the film into a curved surface, and when the drapability is too high, wrinkles are likely to occur.

The basis weight of the prepreg of the present invention is preferably 65 to 450 g/m², more preferably 80 to 400 g/m², and still more preferably 90 to 300 g/m². When the basis weight of the prepreg is 65 g/m² or more, the number of stacked prepregs can be set to be small with respect to the intended thickness of the molded body, so that the work efficiency is improved, which is preferable. When the basis weight of the prepreg is 450 g/m² or more, the drapability of the prepreg tends to be good, which is preferable.

The fiber mass content of the prepreg in the present invention is preferably 10 to 90 mass % based on 100 mass % of the prepreg. The fiber mass content of the prepreg is more preferably 60 to 85 mass %, and still more preferably 70 to 80 mass % based on 100 mass % of the prepreg. When the fiber mass content is 10 mass % or more, the content of reinforcing fibers is high, so that it is easy to obtain the advantage of prepreg that a fiber-reinforced composite material excellent in specific strength and specific elastic modulus can be provided. When the fiber mass content is 90 mass % or less, poor impregnation of the thermosetting resin composition is unlikely to occur, and the resulting composite material tends to have few voids, which is preferable.

As the reinforcing fibers of the fiber-reinforced composite material, various carbon fibers, graphite fibers, glass fibers, PET fibers, nylon fibers, aramid fibers, and the like are preferably used. Of these, a carbon fiber is preferably used because it can provide a light and stiff fiber-reinforced composite material.

The form of the fiber substrate formed of reinforcing fibers is not particularly limited, and examples thereof include long fibers aligned in one direction, tow, woven fabric, mat, knit, braid, blade, and nonwoven fabric. The fiber substrate may be used singly or in combination of two or more kinds thereof.

When the fiber substrate is 5 to 200 g/m², the handleability of the prepreg is improved. When the basis weight of the fiber substrate is 5 g/m² or more, the fiber substrate is hardly broken during handling, and when the basis weight of the fiber substrate is 200 g/m² or less, the drapability of the prepreg is improved, which is preferable.

The curing temperature of the prepreg of the present invention depends on the thermosetting resin to be used, the curing agent to be used, and the curing catalyst, but is preferably 100° C. to 200° C. from the viewpoint of suppressing the occurrence of distortion and wrinkles due to thermal stress.

The tackiness indicating the stickiness of the prepreg of the present invention can be evaluated by the load when the surface of the prepreg is attached to the surface of an FEP film, further reciprocated once with a 2 kg roller to be brought into close contact with the surface of the FEP film, and the prepreg is peeled off in the 30° direction by a tackiness/coating analysis apparatus. When the tackiness of the prepreg is 1 mN/mm or more, it is preferable from the viewpoint of excellent adhesion to the object to be attached, and when the tackiness of the prepreg is 15 mN/mm or less, it is preferable from the viewpoint that the prepreg can be easily peeled off from the object to be attached, and the prepreg can be attached again by correcting the position after peeling once. In addition, the prepreg of the present invention is characterized in that there is a tackiness difference between both surfaces (the prepreg impregnated side is referred to as a resin surface, and the prepreg non-impregnated side is referred to as a fiber substrate surface). The fiber substrate surface of the prepreg is preferably 0 to 10 mN/mm. When the tackiness of the fiber substrate surface is higher than 0 mN/mm, adhesion to a material to be attached to the fiber substrate surface is favorable, and when the tackiness is 10 mN/mm or less, determination of the resin surface and the fiber substrate surface of the prepreg is easy, which is preferable. Furthermore, when the tackiness of the fiber substrate surface is 0 to 0.5 mN/mm, the resin layer contained in the prepreg can be handled from the fiber substrate surface without sticking to the hand, which is particularly preferable.

In the prepreg in the present invention, since the thermosetting resin composition is contained on one surface of the fiber substrate, there is a tackiness difference between the upper and lower surfaces, $\eta 3*24$ is 20,000 to 100,000 Pa·s, $\eta 3*70$ is 100 to 5,000 Pa·s, and the volatile amount is 1 mass % or less, the tackiness of the fiber substrate surface is low, and the thermosetting resin composition contained in the prepreg is hard to be attached to the hand when handled by hand. In addition, it is easy to identify which surface is the fiber substrate surface or the resin surface, and thus the handleability is good. The resin flow during molding is suppressed, and loss and burrs of the thermosetting resin composition in a resulting molded body are reduced, and voids during the molding are also suppressed. Therefore, the prepreg in the present invention has good handleability, and the use of the prepreg makes it possible to design a molded body with high accuracy and without impairing the mechanical characteristics.

The component [A] according to the present invention is a thermosetting resin. The thermosetting resin refers to a resin material that undergoes reaction by heating to form crosslinking. Examples of the thermosetting resin include an epoxy resin, a phenol resin, a polyurethane resin, an isocyanate resin, a polyimide resin, a polyester resin, a cyanate ester resin, and a bismaleimide resin. An epoxy resin is preferably used from the viewpoint of heat resistance, dimensional stability after molding or curing, adhesiveness, and the like. Examples of the epoxy resin include a bisphenol-type epoxy resin, and the bisphenol-type epoxy resin is not particularly limited as long as it is one in which two phenolic hydroxyl groups of a bisphenol compound are reacted with epichlorohydrin to be converted into glycidyloxy groups, and bisphenol A type, bisphenol F type, bisphenol AD type, bisphenol S type, or halogen, an alkyl-substituted product, a hydrogenated product of these bisphenols, and the like are used. In addition, not only the monomer but also a polymer having a plurality of repeating units can be preferably used.

As commercially available amine type epoxy resin, tetraglycidyl diaminodiphenylmethane, tetraglycidyl diaminodiphenyl sulfone, triglycidyl aminophenol, triglycidyl aminocresol, tetraglycidyl xylylenediamine, glycidyl aniline, diglycidyl toluidine, and halogen or alkyl-substituted derivatives and hydrogenated products thereof can be used. Examples of other epoxy resins include tetrahydroindene diepoxide, vinylcyclohexene oxide, 3,4-epoxycyclohexylmethyl 3,4-epoxycyclohexanecarboxylate, dipentene dioxide, bis(3,4-epoxycyclohexylmethyl) adipate, dicyclopentadiene dioxide, bis(2,3-epoxycyclopentyl) ether, 1,2-epoxy-4-(2-oxiranyl)cyclohexane adduct of 2,2-bis(hydroxymethyl)-1-butanol, epoxidized butane tetracarboxylic acid tetrakis-(3-cyclohexenylmethyl) modified epsilon-caprolactone, bi-7-oxabicyclo[4.1.0]heptane, dodecahydrobisphenol A diglycidyl ether, dodecahydrobisphenol F diglycidyl ether, 1,4-cyclohexanedimethanol diglycidyl ether, hexahydrophthalic acid diglycidyl ester, hexahydroterephthalic acid diglycidyl ester, ethylene glycol diglycidyl ether, propylene glycol diglycidyl ether, 1,4-butanediol glycidyl ether, 1,6-hexanediol diglycidyl ether, neopentylene glycol diglycidyl ether, glycerol polyglycidyl ether, diglycerol polyglycidyl ether, trimethylolpropane polyglycidyl ether, sorbitol polyglycidyl ether, 1,4-bis(2-oxiranyl)butane, pentaerythritol polyglycidyl ether, 4-tert-butyl glycidyl ether, butyl glycidyl ether, 1-butene oxide, 1,2-epoxy-4-vinylcyclohexane, and 2-ethylhexyl glycidyl ether.

As the epoxy resin, a commercially available product can be used. Examples of commercially available products of the bisphenol A type epoxy resins include "jER®" 825, 828, 834, 1001, 1002, 1003, 1003F, 1004, 1004AF, 1005F, 1006FS, 1007, 1009, 1010 (all manufactured by Mitsubishi Chemical Corporation). Examples of the brominated bisphenol A type epoxy resins include "jER®" 505, 5050, 5051, 5054, and 5057 (all manufactured by Mitsubishi Chemical Corporation).

Examples of commercially available bisphenol F type epoxy resin include "jER®" 806, 807, 4002P, 4004P, 4007P, 4009P, and 4010P (all manufactured by Mitsubishi Chemical Corporation), and "Epotohto®" YDF2001 and YDF2004 (all manufactured by NIPPON STEEL Chemical & Material Co., Ltd.). Examples of the tetramethylbisphenol F type epoxy resin include YSLV-80 XY (manufactured by NIPPON STEEL Chemical & Material Co., Ltd.) and the like.

Examples of the bisphenol S epoxy resin include "EPICLON®" EXA-1514 (manufactured by DIC Corporation)

As the compound tetraglycidyldiaminodiphenylmethane, for example, the following products are usable: "SUMI-EPOXY®" ELM434, (manufactured by Sumitomo Chemical Co., Ltd.), YH434L (manufactured by NIPPON STEEL Chemical & Material Co., Ltd.), "jER®" 604 (manufactured by Mitsubishi Chemical Corporation), "Araldite®" MY720 and MY721 (manufactured by Huntsman Advanced Material LLC), and the like. As tetraglycidyl diaminodiphenyl sulfone, TGDDS (manufactured by Konishi Chemical Ind. Co., Ltd.) and the like can be used. As the triglycidylaminophenol or a triglycidylaminocresol, the following products are usable: "SUMIEPOXY®" ELM100 and ELM120 (manufactured by Sumitomo Chemical Co., Ltd.), "Araldite®" MY0500, MY0510 and MY0600 (manufactured by Huntsman Advanced Material LLC), and "jER®" 630 (manufactured by Mitsubishi Chemical Corp.). As the compound tetraglycidylxylylenediamine or a hydrogenated compound thereof, the following products are usable: "TETRAD®"-X, and "TETRAD®"-C (manufactured by Mitsubishi Gas Chemical Co., Inc.). As diglycidyl aniline, GAN (manufactured by Nippon Kayaku Co., Ltd.) and the like can be used. As diglycidyl toluidine, GOT (manufactured by Nippon Kayaku Co., Ltd.) and the like can be used.

Examples of other epoxy resins include "CELLOXIDE" 2021P, "CELLOXIDE®" 8010, "CELLOXIDE®" 2000, "EPOLEAD®" GT401, "CELLOXIDE®" 2081, EHPE3150 (manufactured by Daicel Corporation), THI-DE (manufactured by ENEOS Corporation), TTA21, AAT15, and TTA22 (manufactured by Sun Chemical Corporation), Ex-121, Ex-211, Ex-212, Ex-313, Ex-321, and Ex-411 (manufactured by Nagase ChemteX Corporation), and "EPOLITE®" 4000 (manufactured by Kyoeisha Chemical Co., Ltd.), ST-3000, ST-4000, ST5080, ST4000 D, ST4100 D, and ST5100 (manufactured by NIPPON STEEL Chemical & Material Co., Ltd.).

The component [B] is the curing agent of [A]. Examples of the curing agent include an amine curing agent, an alcohol compound, a phenol compound, a cationic curing agent, an anionic curing agent, a radical curing agent, an acid anhydride compound, and an imidazole compound. Examples of the amine curing agent include dicyandiamide or a derivative thereof, and diaminodiphenyl sulfone or a derivative thereof. Here, dicyandiamide can control the reactivity of the curing reaction induced by using dicyandiamide in combination with a urea amine curing agent or a urea compound.

As the curing agent, a commercially available product can be used. Examples of the commercial product of such dicyandiamide include DICY-7 and DICY-15 (all manufactured by Mitsubishi Chemical Corporation).

Depending on the position of the amino group and diaminodiphenyl sulfone has a structural isomer. Examples of commercially available products of 4,4'-diaminodiphenyl sulfone include "SEIKACURE®"-S (manufactured by SEIKA CORPORATION), SUMICURE® S (manufactured by Sumitomo Chemical Co., Ltd.). Examples of commercially available products of 3,3'-diaminodiphenyl sulfone include 3,3'-DAS (manufactured by MITSUI FINE CHEMICALS, INC.). The blending amount of the amine curing agent is preferably 5 to 70 parts by mass with respect to 100 parts by mass of the component [A].

Examples of commercially available products of the imidazole compound include "CUREZOL®" 2MZ, 2PZ, and 2E4MZ (manufactured by Shikoku Chemicals Corporation).

Examples of the cationic curing agent include 1-naphthylmethylmethyl p-hydroxyphenylsulfonium=hexafluoroantimonate, 2-methylbenzylmethyl p-hydroxyphenylsulfonium hexafluoroantimonate, benzylmethyl p-hydroxyphenylsulfonium hexafluoroantimonate, dimethyl-p-acetoxyphenylsulfonium hexafluoroantimonate, a diaryliodonium salt, boron oxyfluoride piperidine, boron oxyfluoride monoethylamine, a diaryliodonium salt, and a sulfonium salt.

Examples of commercially available products of the cationic curing agent include "ADEKA OPTON®" CP-77, "ADEKA OPTON®" CP-66 (manufactured by ADEKA Corporation), CI-2639 and CI-2624 (Nippon Soda Co., Ltd.), "SAN-AID®" SI-60, "SAN-AID®" SI-80, "SAN-AID®" SI-100, "SAN-AID®" SI-150, "SAN-AID®" SI-B4, "SAN-AID®" SI-B5 (manufactured by Sanshin Chemical Industry Co., Ltd.), TA-100, IK-1PC (80) (manufactured by San-Apro Ltd.), boron trifluoride piperidine, and boron trifluoride monoethylamine (manufactured by Stellachemifa Corporation). The cationic curing agent is preferably a photothermal cationic curing agent or a thermal cationic curing agent. The photothermal cationic curing agent refers to a material that reacts by applying light of a certain wavelength or less such as ultraviolet rays or visible light or heat of a certain temperature or more, and the thermal cationic curing agent refers to a material that reacts by heat. The photothermal cationic curing agent is preferably used because it can be cured in a wide variety of environments, and a thermal cationic curing agent is preferable because high storage stability can be obtained by temperature control.

Examples of the anionic curing agent include phosphorus hexafluoride, antimony hexafluoride, arsenic hexafluoride, tin hexachloride, iron tetrachloride, bismuth pentachloride, and niobium hexachloride.

When the cationic curing agent and the anionic curing agent are contained in an amount of preferably 0.5 to 10 parts by mass, more preferably 1 to 5 parts by mass, and still more preferably 1 to 3 parts by mass with respect to 100 parts by mass of the component [A] contained in the thermosetting resin composition, the thermosetting resin composition has fast curability, and a good balance between resin flow during molding, an effect of suppressing volatile amount, fast curability, pot life, and UV resistance can be obtained.

As the cationic curing agent and the anionic curing agent, a curing aid that controls reactivity can be used. Examples of the curing aid include 4-hydroxyphenyldimethylsulfonium=methyl sulfate and 4-(methylthio) phenol. In addition, commercially available products of curing aids can be used, and examples thereof include "SAN-AID®" (SI-S and "SAN-AID®" S-ME (manufactured by Sanshin Chemical Industry Co., Ltd.).

When the curing aid is contained in an amount of preferably 0.1 to 10 parts by mass, more preferably 0.1 to 5 parts by mass, still more preferably 0.1 to 2.5 parts by mass with respect to 100 parts by mass of the component [A] contained in the thermosetting resin composition, a good balance between the fast curability and the pot life of the thermosetting resin composition can be obtained.

In the thermosetting resin composition according to the present invention, it is also a preferred aspect that the thermosetting resin composition contains a thermoplastic resin. Examples of the thermoplastic resin include polyamide, polycarbonate, polyacetal, polyphenylene oxide, polyphenylene sulfide, polyarylate, polyester, polyamideimide, polyimide, polyetherimide, polyimide having a phenyltrimethylindane structure, polysulfone, polyethersulfone, polyetherketone, polyetheretherketone, polyaramid, polyethernitrile, and polybenzimidazole polyvinyl alcohol, polyvinyl acetal, polyvinyl formal, polyvinyl acetoacetyl, polyvinyl butyral, polyvinyl acetate, hydrogenated bisphenol A/pentaerythrol phosphite polymer, hydrogenated terpene, and hydrogenated terpene phenol.

These thermoplastic resins are preferably soluble in the thermosetting resin of the component [A]. For example, as a result of adding at least 10 parts by mass of a thermoplastic resin powder relative to 100 parts by mass of the thermosetting resin of the component [A] and kneading the mixture at 100° C. to 120° C. for 1 hour, it is said that the thermoplastic resin powder can be melted when the amount of the thermoplastic resin powder is reduced from the initial amount. The expression "the amount of the thermoplastic resin powder is reduced" refers to a case where the weight decreases to an optically unobservable level, or a case where a decrease in mass of 10% or more from the initial amount is observed when the remaining powder is recovered. From the viewpoint of dissolving the thermoplastic resin in the thermosetting resin, the powder of the thermoplastic resin preferably has a volume average particle diameter obtained at least by a laser diffraction method of 100 μm or less. In addition, when the volume average particle diameter is more than 100 nm, it is preferable to suppress aggregation during storage and to easily stir the thermosetting resin.

As the thermoplastic resin, a commercially available product can be used. For example, "SUMIKA EXCEL®" PES3600P, "SUMIKA EXCEL®" PES5003P, "SUMIKA EXCEL®" PES5200P, "SUMIKA EXCEL®" PES7600P (all manufactured by Sumitomo Chemical Co., Ltd.), "VIRANTAGE®" VW-10700 RFP (manufactured by Solvay Advanced Polymers), copolymer oligomers of polyethersulfone and polyetherethersulfone, "ULTEM®" 1000, "ULTEM®" 1010, "ULTEM®" 1040 (all manufactured by SABIC Innovative Plastics), and the like, which are commercial products of polyetherimide, and as other thermoplastic resins, "J-POVAL®" (manufactured by JAPAN VAM & POVAL CO., LTD.), "VINYLEC®" (manufactured by JNC Corporation), "S-LEC®" (manufactured by SEKISUI CHEMICAL CO., LTD.), "ULTRACENE®" (manufactured by Tosoh Corporation), JPH-3800 (manufactured by Jouhoku Chemical Industry), YS Polyster UH130 (manufactured by Yasuhara Chemical Co., LTD), and the like.

When the thermoplastic resin is contained in an amount of preferably 1 to 60 parts by mass, more preferably 10 to 55 parts by mass, still more preferably 30 to 55 parts by mass with respect to 100 parts by mass of the component [A] contained in the thermosetting resin composition, a prepreg having good tackiness characteristics can be obtained.

When polyethersulfone is used as the thermoplastic resin, polyethersulfone having a molecular weight of 10,000 to 60,000 g/mol is more preferably used, further preferably 12,000 to 50,000 g/mol, and particularly preferably 15,000 to 30,000 g/mol. When the molecular weight is in the above preferred range, the tackiness of the prepreg is moderate, the handleability is good, and the toughness of the cured product of the thermosetting resin composition is less likely to decrease. On the other hand, when the thermosetting resin composition is dissolved in the thermosetting resin, the viscosity of the thermosetting resin composition is moderate, and the prepreg is easily formed. In particular, when polyethersulfone having high heat resistance with a molecular weight of 15,000 to 30,000 g/mol is dissolved in the thermosetting resin, a large amount of the thermoplastic resin can be dissolved in the thermosetting resin as long as there is no problem in the process of prepreg formation, high toughness can be imparted to the cured product of the thermosetting resin composition while maintaining the flexural modulus, and high tensile strength and compressive strength can be imparted to the obtained fiber-reinforced composite material. Here, the molecular weight refers to a weight average molecular weight in terms of polystyrene by gel permeation chromatography using HLC-8420 GPC (manufactured by Tosoh Corporation) (hereinafter, the same applies).

In addition, when the molecular weights of polyvinyl acetal, polyvinyl formal, polyvinyl acetoacetyl, polyvinyl butyral, polyvinyl acetate, hydrogenated bisphenol A/pentaerythritol phosphite polymer, hydrogenated terpene, and hydrogenated terpene phenol are preferably 5,000 to 70,000 g/mol, more preferably 7,000 to 65,000 g/mol, and still more preferably 10,000 to 60,000 g/mol, a good balance between the uniformity of dissolution in the thermosetting resin composition and the effect of suppressing the resin flow can be obtained. Examples of commercially available products having different molecular weights include polyvinyl formal ("VINYLEC®" K, manufactured by JNC Corporation, molecular weight 40,000 to 54,000 g/mol), polyvinyl formal ("VINYLEC®" E, manufactured by JNC Corporation, molecular weight 95,000 to 134,000 g/mol), and polyvinyl acetoacetyl ("S-LEC®" KS-10, manufactured by SEKISUI CHEMICAL CO., LTD., molecular weight: 17,000 g/mol).

<Method for Producing Prepreg>

The prepreg of the present invention can be produced by, for example, coating the thermosetting resin composition according to the present invention on a release sheet to form a film-shaped resin material having a sheet form, pre-curing the film-shaped resin material with the release sheet by light or heat (in the present invention, the materials obtained by pre-curing the film-shaped resin material and the film-shaped resin material with a release sheet are referred to as a "resin film" and a "resin film with a release sheet", respectively), and impregnating the resin film from one surface of the fiber substrate. Here, the release sheet is a material that facilitates release of a resin film, a resin film, or a cured resin film, and examples thereof include a release paper and a release film. The release sheet is preferably paper (release paper) from the viewpoint of strength and handleability.

Coating of the thermosetting resin composition on the release sheet is performed by a hot-melt method. In the production of the film-shaped resin material with a release sheet in the hot-melt method, the viscosity of the thermosetting resin composition is important. The viscosity of the thermosetting resin composition was measured by using a dynamic viscoelasticity apparatus ARES-2KFRTN1-FCO-STD (manufactured by TA Instruments). The complex viscosity is determined by using flat parallel plates having a diameter of 40 mm as upper and lower measuring jigs, setting the thermosetting resin composition between the upper and lower jigs so that the distance between the upper and lower jigs is 1 mm, and then measuring the complex viscosity while raising the temperature from 20° C. to 150° C. at a rate of 2° C./min in a torsion mode (measurement frequency: 0.5 Hz). Here, the complex viscosity of the thermosetting resin composition at 24° C. is represented by $\eta 1*24$, and the complex viscosity at 70° C. is represented by $\eta 1*70$. $\eta 1*70$ is preferably 1 to 500 Pa·s in terms of process passability. When $\eta 1*70$ is 1 Pa·s or more, the film-shaped resin material can remain without flowing on the release sheet, which is preferable. When $\eta 1*70$ is 500 Pa·s or less, the film-shaped resin material can be produced with a stable basis weight without defects on the release sheet, which is preferable.

A resin film can be produced by pre-curing the film-shaped resin material according to the present invention. In the present invention, when simply referred to as a "resin film", the resin film is a pre-cured resin film after pre-curing. The pre-curing of the film-shaped resin material is performed by placing the film-shaped resin material with a sheet-shaped or roll-shaped release sheet in an oven, heating the film-shaped resin material, irradiating the film-shaped resin material with light, or the like. This pre-curing step is performed alone on the film-shaped resin material before the film-shaped resin material is stacked on the fiber substrate. The complex viscosity $\eta 2*24$ at 24° C. of the pre-cured resin film is 20,000 to 100,000 Pa·s, and the complex viscosity $\eta 2*70$ at 70° C. is 100 to 5,000 Pa·s.

The film-shaped resin material with a release sheet may be heated with an IR heater or the like, or the release paper surface of the film-shaped resin material with a release sheet may be brought into contact with a thermal plate. The temperature of the oven, the furnace, the IR heater, and the thermal plate during the pre-curing is preferably 40° C. to 200° C. When the temperature is 40° C. or higher, the pre-curing time can be shortened, and when the temperature is 200° C. or lower, the film-shaped resin material can be uniformly pre-cured. The wavelength of light in the case of performing pre-curing by irradiating the film-shaped resin material with light is not particularly limited, and ultraviolet light of 100 to 400 nm in which a general photocuring agent absorbs ultraviolet rays is more preferable. Although depending on the curing temperature and illuminance of ultraviolet rays/visible light, it is preferable to pre-cure the film over 0.005 to 24 hours from the viewpoint of uniformity of the film. The curing by light or heat may be performed so that the fluidity of the surface of the film-shaped resin material is lost, or the degree of curing may be optionally adjusted to leave a certain degree of fluidity.

The resin flow of the prepreg decreases as the fluidity of the surface of the film-shaped resin material decreases, and when different materials such as the prepreg and a fiber-reinforced composite material precursor different from the prepreg (an uncured intermediate substrate in which a thermosetting resin such as a prepreg is impregnated into a reinforced fiber) are combined, the amount of thermosetting resins mixed with each other during the molding process can be suppressed, which is preferable. When the degree of curing is optionally adjusted to leave a certain degree of fluidity, adhesion between the prepregs or between the prepreg and the different material or adhesion between the materials adhered before molding in the fiber-reinforced composite material obtained by molding the prepregs and the different materials is preferably improved.

The degree of curing of the resin film can be calculated by determining the ratio between the residual exothermic peak after the pre-curing and the exothermic peak before the pre-curing by the temperature rising measurement of DSC of the film-shaped resin material and the resin film before and after the pre-curing. The degree of curing after pre-curing is preferably 1 to 70%. When the degree of curing is 1% or more, the tackiness, resin flow, and volatile amount of the resin film can be designed to be low, and when the degree of curing is 70% or less, impregnation of the resin film into reinforcing fibers becomes easy, which is preferable.

The resin film according to the present invention can be used for a resin film infusion (RFI) material. The resin film can be stacked on a fiber substrate preformed into a mold without excessive adhesion in stacking in preparation for molding in RFI, and is excellent in the handleability. In addition, since the resin flow of the resin film during molding is as small as 10 mass % or less, it is very easy to design the contents of the resin and the fiber substrate of the molded body, and since the burrs of the fiber-reinforced composite material are reduced, there is an advantage that the trimming treatment of the burrs is facilitated.

A prepreg can be produced by impregnating the fiber substrate with the resin film according to the present invention by heating and pressurization. The prepreg can be molded by stacking one or more prepregs or different materials. The prepreg or the laminate using the prepreg can be obtained by autoclave molding, press molding, oven curing or the like to obtain a molded body (referred to as a fiber-reinforced composite material).

The volatile amount of the prepreg produced by the present invention is less than 1 mass %, and it is possible to suppress the influence to the environment in which the prepreg is handled. In addition, the resin flow of the prepreg is as small as less than 10 mass %, which make it very easy to design the contents of the resin and the fiber substrate of the fiber-reinforced composite material, and since the burrs of the fiber-reinforced composite material are reduced, there is an advantage that the trimming treatment of the burrs is facilitated.

The basis weight of the film-shaped resin material and the resin film according to the present invention is preferably 10 to 300 g/m$^2$. The basis weight of the resin film is also maintained in the pre-cured resin film. When the basis weight of the film-shaped resin material and the resin film is 10 g/m$^2$ or more, reinforcing fibers can be sufficiently impregnated with the film-shaped resin material, and mechanical characteristics such as compression and tensile properties of the fiber-reinforced composite material can be sufficiently exhibited, and in order to obtain a predetermined thickness during molding of the fiber-reinforced composite material, the number of stacked prepregs can be reduced, which is preferable because of excellent work efficiency. When the basis weight of the resin film is 300 g/m$^2$ or less, heat generation due to curing of the thermosetting resin composition is suppressed when the resin film is molded as prepreg, and the drapability of the prepreg tends to be good, which is preferable. The drapability refers to flexibility of deformation of the prepreg, and is a characteristic that affects shapeability into a mold at the time of stacking. When the drapability is low, it is difficult to shape the film into a curved surface, and when the drapability is too high, wrinkles are likely to occur.

The basis weight of the prepreg of the present invention is preferably 65 to 450 g/m$^2$, more preferably 80 to 400 g/m$^2$, and still more preferably 90 to 300 g/m$^2$. When the basis weight of the prepreg is 65 g/m$^2$ or more, the number of stacked prepregs can be set to be small with respect to the intended thickness of the molded body, so that the work efficiency is improved, which is preferable. When the basis weight of the prepreg is 450 g/m$^2$ or more, the drapability of the prepreg tends to be good, which is preferable.

The fiber mass content of the prepreg produced by the present invention is preferably 10 to 90 mass %, more preferably 60 to 85 mass %, and still more preferably 70 to 80 mass % when the total mass of the prepreg is 100 mass %. When the fiber mass content is 10 mass % or more, the content of reinforcing fibers is high, so that it is easy to obtain the advantage of prepreg that a fiber-reinforced composite material excellent in specific strength and specific elastic modulus can be provided. When the fiber mass content is 90 mass % or less, poor impregnation of the resin layer contained in the prepreg is unlikely to occur, and the resulting composite material tends to have few voids, which is preferable.

As the reinforcing fibers of the fiber-reinforced composite material, various carbon fibers, graphite fibers, glass fibers, PET fibers, nylon fibers, aramid fibers, and the like are preferably used. Of these, a carbon fiber is preferably used because it can provide a light and stiff fiber-reinforced composite material.

The form of the fiber substrate formed of reinforcing fibers is not particularly limited, and examples thereof include long fibers aligned in one direction, tow, woven fabric, mat, knit, braid, blade, and nonwoven fabric. The fiber substrate may be used singly or in combination of two or more kinds thereof.

When the fiber substrate is 5 to 200 g/m$^2$, the handleability of the prepreg is improved. When the basis weight of the fiber substrate is 5 g/m$^2$ or more, the fiber substrate is hardly broken during handling, and when the basis weight of the fiber substrate is 200 g/m$^2$ or less, the drapability of the prepreg is improved, which is preferable.

The curing temperature of the prepreg produced by the present invention depends on a main agent of the thermosetting resin to be used, the curing agent to be used, and the curing catalyst, but is preferably 100° C. to 200° C. from the viewpoint of suppressing the occurrence of distortion and wrinkles due to thermal stress.

The tackiness indicating the stickiness of the prepreg produced by the present invention can be evaluated by the load when the surface of the prepreg is attached to the surface of an FEP film, further reciprocated once with a 2 kg roller to be brought into close contact with the surface of the FEP film, and the prepreg is peeled off in the 30° direction by a tackiness/coating analysis apparatus. When the tackiness of the prepreg produced by the present invention is 1 mN/mm or more, it is preferable from the viewpoint of excellent adhesion to the object to be attached, and when the tackiness of the prepreg is 15 mN/mm or less, it is preferable from the viewpoint that the prepreg can be easily peeled off from the object to be attached, and the prepreg can be attached again by correcting the position after peeling once. In addition, it is possible to provide a difference in tackiness on both surfaces of the prepreg by the production method in the present invention. The impregnated side of the prepreg is referred to as a resin surface, and the non-impregnated side is referred to as a fiber substrate surface. The fiber substrate surface of the prepreg is preferably 0 to 10 mN/mm. When the tackiness of the fiber substrate surface is higher than 0 mN/mm, adhesion to a material to be attached to the fiber substrate surface is favorable, and when the tackiness is 10 mN/mm or less, determination of the resin surface and the fiber substrate surface of the prepreg is easy, which is preferable. Furthermore, when the tackiness of the fiber substrate surface is 0 to 0.5 mN/mm, the resin layer contained in the prepreg can be handled from the fiber substrate surface without sticking to the hand, which is particularly preferable.

The tackiness force and the resin flow of the prepreg produced by the present invention and the production process passability and quality of the prepreg depend on the viscosity of the pre-cured resin film produced by the present invention. The viscosity of the pre-cured resin film produced by the present invention can be measured by using a dynamic viscoelasticity apparatus ARES-2KFRTN1-FCO-STD (manufactured by TA Instruments). The complex viscosity is determined by using flat parallel plates having a diameter of 40 mm as upper and lower measuring jigs, setting the pre-cured resin film produced by the present invention between the upper and lower jigs so that the distance between the upper and lower jigs is 1 mm, and then measuring the complex viscosity $\eta 2^*$ while raising the temperature from 20° C. to 150° C. at a rate of 2° C./min in a torsion mode (measurement frequency: 0.5 Hz).

The complex viscosity $\eta 2^*24$ at 24° C. of the thermally cured resin film produced according to the present invention is preferably 20,000 to 100,000 Pa·s. When $\eta 2^*24$ is 20,000 Pa·s or more, the tackiness of the resin layer contained in the prepreg or the prepreg is low, and the resin layer contained in the prepreg hardly adheres to the hand or the workplace when handling the prepreg, so that handleability is preferable. When $\eta 2^*24$ is 100,000 Pa·s or less, impregnation of the resin layer into the fiber substrate is facilitated. In addition, it is preferable from the viewpoint of maintaining high adhesiveness to an object to be stacked at the time of stacking the prepreg. It is more preferable that $\eta 2^*24$ is 25,000 to 90,000 Pa·s, and it is still more preferable that $\eta 2^*24$ is 40,000 to 90,000 Pa·s.

The complex viscosity ratio $\eta 2^*70$ at $\eta 70°$ C. is preferably 100 to 5,000 Pa·s. When $\eta 2^*70$ is 100 Pa·s or more, the resin flow of the prepreg is reduced, and burrs during molding of the prepreg are suppressed, which is preferable. The larger the complex viscosity, the smaller the resin flow. When $\eta 2^*70$ is 5,000 Pa·s or less, the adhesiveness after molding with a prepreg to be stacked is improved, which is preferable. It is more preferable that $\eta 2^*70$ is 500 to 4,000 Pa·s, and it is still more preferable that $\eta 2^*70$ is 2,000 to 4,000 Pa·s.

EXAMPLES

Hereinafter, the present invention will be described in detail with reference to examples. However, the scope of the present invention is not limited to these examples. Measurements of various characteristics were performed under an environment in which a temperature was 24° C. and a relative humidity was 50% unless otherwise noted.

Materials Used in Examples and Comparative Examples (1) Structural Component [A]: Thermosetting Resin
Bisphenol A type epoxy resin ("jER®" 828, manufactured by Mitsubishi Chemical Corporation), epoxy equivalent: 175 (g/eq.))
Tetraglycidyl diaminodiphenylmethane ("Araldite® MY721, manufactured by Huntsman Advanced Materials GmbH) epoxy equivalent weight: 120 (g/eq.)
3,4-epoxycyclohexane carboxylic acid 3,4-epoxycyclohexylmethyl, ("CELLOXIDE®" 2021P (manufactured by Daicel Corporation): epoxy equivalent of 136 (g/eq.)
(2) Component [B]: Curing Agent of [A].
3,3'-DAS (3,3'-diaminodiphenylsulfone, manufactured by Mitsui Fine Chemical, Inc.).
Benzylmethyl p-hydroxyphenylsulfonium hexafluoroantimonate ("SAN-AID®" SI-100, manufactured by San-shin Chemical Industry Co., Ltd.)
(3) Thermoplastic Resin
Polyvinyl formal ("VINYLEC®" K manufactured by JNC Corporation)
Polyethersulfone ("SUMIKA EXCEL®" PES5003P, manufactured by Sumitomo Chemical Co., Ltd.).
(4) Fiber Substrate
C06142 (Textile using carbon fiber T300 (plain weave), weave mass: 119 g/m², manufactured by Toray Industries, Inc.).

<Thermosetting Resin Composition and Method for Producing Prepreg>

Thermosetting resin compositions and prepregs of Examples and Comparative Examples were produced by the following methods.

(I) Production of Resin Film

In a kneader, predetermined amounts of [A] and a thermoplastic resin described in Tables 1 to 4 were added, heated to 150° C. while being kneaded, and then kneaded at 150° C. for 1 hour to give a viscous liquid. The temperature was lowered while kneading to 80° C., [B] was added at 70° C. or lower, and further kneading was performed to obtain a thermosetting resin composition (kneading). Subsequently, a film-shaped resin material was produced. The prepared thermosetting resin composition was applied onto release paper with a basis weight of 100 g/m² using a knife coater to produce a film-shaped resin material. In addition, the quality of the produced film-shaped resin material was visually confirmed. When the quality is not good, there are places where the thermosetting resin composition is not applied in stripes or polka dots on the release paper, there are places where the thermosetting resin composition is applied in islands, the basis weight of the film-shaped resin material deviates from a target basis weight by 10% or more, the thermosetting resin composition does not pass through a knife coater, and the like, and good quality of the film-shaped resin material means a state in which the above problem does not occur.

The obtained film-shaped resin material was pre-cured to obtain a pre-cured resin film. The pre-curing method is as follows. The film-shaped resin material coated on the release film was pre-cured at a temperature lower than or equal to the curing temperature. Although the indication of the pre-curing is adjusted by the degree of curing, the appropriate pre-curing temperature and treatment time were determined in advance from the ratio of exothermic peaks associated with thermal curing at the time of temperature rise in DSC measurement before and after the pre-curing. Specifically, the produced film-shaped resin material was put into a hot air dryer (PVH-330, manufactured by ESPEC Corp.) at a temperature and for a time described in Tables 1 to 4 to be pre-cured, thereby obtaining a pre-cured resin film. The resin film is pre-cured.

(II) Method for Producing Prepreg

One pre-cured resin film produced in (I) was overlaid on one surface of the fiber substrate on the fiber substrate C06142, and was then impregnated with the thermosetting resin composition by heating and pressurization to obtain a fiber fabric prepreg. In the obtained prepreg, a fiber substrate and a resin layer containing a thermosetting resin composition were stacked very thinly on one surface of the fiber substrate, and the fiber substrate was impregnated with a part of the thermosetting resin composition in the resin layer. Here, regarding the degree of impregnation of the thermosetting resin composition into the fiber substrate, since the complex viscosity is increased by performing pre-curing, the opposite surface of the fiber substrate was not completely impregnated, or even if it was impregnated, the amount was not sufficient. That is, the surface side on which the resin film was stacked had a larger impregnation amount of the thermosetting resin composition than the fiber substrate surface on the opposite surface. The surface of the reinforcing fiber impregnated with the pre-cured resin film is referred to as a resin surface, and the opposite surface is referred to as a fiber substrate surface.

<Method for Evaluating Characteristics of Prepreg>

Sampling of Resin Layer from Prepreg

The obtained prepreg is sampled for characteristic evaluation. The prepreg produced in (II) is sandwiched between two release papers, the resin layer contained in the prepreg is partially separated from the fiber substrate by applying heat and pressure with an iron set at 120° C., the resin layer contained in the prepreg attached to the release sheet is sampled, and the complex viscosities (D) η3*24 and η3*70 of the prepreg were measured. There was no significant difference in complex viscosity between the pre-cured resin film and the resin layer contained in the prepreg sampled from the prepreg, but the complex viscosity of the resin layer sampled from the prepreg was higher than that of the resin film.

(A) Measurement of Volatile Amount of Prepreg

The prepreg produced as a sample was cut into an 8 cm square, the mass of the prepreg was measured (mass: W1), and the prepreg placed on a release paper was placed in an oven at 180° C. for 1 hour. Thereafter, the prepreg and the release paper were taken out from the oven, left in a desiccator for 30 minutes, and then the mass of the prepreg was measured (mass: W2), and calculated as the volatile amount [mass %] in the present invention according to the following calculation formula.

$$(W1-W2)/W1 \times 100 \text{ [mass \%]}$$

(B) Measurement of Resin Flow of Prepreg

The prepreg produced as a sample was cut into a 10 cm square, and four 10 cm square prepregs were stacked, and the mass of the laminate was measured (W3). The sheet was sandwiched between two 15 cm square release films cut, and further sandwiched between two 10 cm square metal plates (400 g of one sheet), and in this state, the sheet was molded (180° C. under 6 atm for 2 hours, temperature increase 1.7° C./min) by an autoclave. After the molding, the prepreg protruding from the 10 cm square metal plate was removed, and the mass of the cured 10 cm square prepreg laminate was measured (mass: W4). The resin flow was calculated as the resin flow [mass %] in the present invention by the following calculation formula.

$$(W3-W4)/W3 \times 100 \text{ [mass \%]}$$

(C) Measurement of Tackiness of Prepreg

The prepreg produced as a sample was cut into a length of 30 cm and a width of 2 cm, the surface to be measured for tackiness was attached to a FEP film (TOYOFLON (50 μm thick), manufactured by TORAY ADVANCED FILM CO., LTD.) having the same size, and in this state, the prepreg and the FEP film were sandwiched between two release papers, and a reciprocating load was applied with a 2 kg roller to bring the prepreg and the FEP film into close contact with each other. Using an adhesive/coating analyzer (VPA-2, manufactured by Kyowa Interface Science Co., Ltd.), the tackiness was obtained by measuring the average load when the prepreg was peeled off from the FEP film at a speed of 200 mm/min in the direction of 30°, and calculating the average value. The average load per unit width (unit: mN/mm) was determined. The tackiness force was measured on the resin surface and the fiber substrate surface of the prepreg.

(D) Viscosity Measurement of Resin Layer Contained in Thermosetting Resin Composition, Resin Film, and Prepreg The three viscosities of the thermosetting resin composition (kneading) produced in (I), the pre-cured resin film, and the resin layer contained in the prepreg sampled in (II) were measured by using a dynamic viscoelasticity apparatus ARES-2KFRTN1-FCO-STD (manufactured by TA Instruments). A flat parallel plate with a diameter of 40 mm was used as upper and lower measuring jigs, and the thermosetting resin composition was set between the upper and lower jigs so that the distance between the upper and lower jigs was 1 mm, and then measurement was performed in a torsion mode (measurement frequency: 0.5 Hz). The temperature was raised from 20° C. to 150° C. at a rate of 2° C./min, and η1*24, η1*70, η2*24, η2*70, η3*24, and η3*70 were obtained. The complex viscosity of the thermosetting resin composition (kneading) is referred to as η1*, the complex viscosity of the resin film after pre-curing, that is, stacked on the fiber substrate is referred to as η2, and the complex viscosity of the resin layer contained in the prepreg sampled from the prepreg is referred to as η3*. The number after * indicates the measured temperature.

(E) Evaluation of Impregnation Result of One Surface of Prepreg

The impregnation state of the thermosetting resin composition was evaluated with a microscope. The impregnation state was evaluated according to the following rank.

Poor: A resin surface layer completely impregnated from the resin surface side to the fiber substrate side and covering the entire surface on the fiber substrate surface side is present.

Good: The resin surface side is impregnated, but the resin surface is not present or the resin is partially present on the surface layer on the fiber substrate surface side.

Examples 1 to 8

In Examples 1 to 8, a thermosetting resin composition was prepared by applying 3,3'-diaminodiphenylsulfone as a curing agent to a thermosetting resin obtained by bisphenol A type epoxy alone or a mixture of bisphenol A type epoxy and tetraglycidyl diaminodiphenylmethane. A film-shaped resin material was produced, a resin film was produced by pre-curing the film-shaped resin material, and one surface of a fiber substrate was impregnated with the resin film to produce a prepreg. The viscosity of the thermosetting resin composition was adjusted by the addition amount of the thermoplastic resin.

All of η1*70 described in Examples 1 to 8 were 500 Pa·s or less. A film-shaped resin material was produced at 70° C., and it was shown that the quality of the film-shaped resin material was good by visual observation and basis weight measurement.

The thermosetting resin composition of Examples 1 to 7 was pre-cured at 90° C., and the thermosetting resin composition of Example 8 was pre-cured at 80° C. for the time shown in Table 1 to obtain a resin film.

One surface of the fiber substrate was impregnated with the resin film of Examples 1 to 8 to produce a prepreg. There was a tackiness difference between the fiber substrate surface and the resin surface in each prepreg, and it was shown that the handleability of the prepreg of Examples 1 to 8 was good. It was shown that the higher the complex viscosities η2*24 and η3*24, the lower the resin surface tackiness and the fiber substrate surface tackiness, respectively. In Examples 3, 5, 7, and 8, the fiber substrate surface tackiness was 0 mN/mm, and the prepreg had tackiness only on the resin surface, and the handleability was particularly preferable.

η2*70 and η3*70 of Examples 1 to 8 were both 100 to 5,000 Pa·s. η2*70 and η3*70 of Examples 1, 4, and 6 were less than 500 Pa·s, and it was shown that the resin flow was large as compared with Examples 2, 3, 7, and 8, but the resin amount loss in burrs and molding was small, and there was no problem. On the other hand, η2*70 and η3*70 of Examples 3, 5, 7, and 8 exceeded 500 Pa·s, and η3*70 of Example 2 exceeded 500 Pa·s. It was shown that the prepregs of Examples 2, 3, 7, and 8 are particularly preferable because the resin flow is small, and the resin amount loss in burrs and molding can be further suppressed as compared with Examples 1, 4, and 6.

In addition, it was shown that the prepreg of Examples 3, 7, and 8 in which the value of η2*70 exceeded 500 Pa·s was better and more preferable in the process for producing the prepreg and the process passability of the obtained prepreg than the prepreg of Examples 1, 2, 4, and 6 in which the value of η2*70 was less than 500 Pa·s. The passability of the pre-cured resin film in the step was good in all Examples.

One surface of the prepreg described in Examples 1 to 8 was satisfactory because no resin was present or only a resin was partially present in the surface layer on the fiber substrate surface side, and no resin layer was present in the surface layer on the fiber substrate surface side.

Examples 9 to 12

In Examples 9 to 12, a thermosetting resin composition was prepared in which 3,4-epoxycyclohexanecarboxylic acid 3,4-epoxycyclohexylmethyl was used as a thermosetting resin, and benzylmethyl p-hydroxyphenylsulfonium hexafluoroantimonate was applied as a curing agent. A film-shaped resin material was produced, a resin film was produced by pre-curing the film-shaped resin material, and one surface of the fiber substrate was impregnated with the resin film to produce a prepreg. The viscosity of the thermosetting resin composition was adjusted by the addition amount of the thermoplastic resin.

All of η1*70 described in Examples 9 to 12 were 500 Pa·s or less. A film-shaped resin material was produced at 70° C., and it was shown that the quality of the film-shaped resin material was good by visual observation and basis weight measurement.

The film-shaped resin material of Examples 9 to 12 was pre-cured at 70° C. for the time shown in Table 2 to obtain a resin film.

One surface of the fiber substrate was impregnated with the resin film of Examples 9 to 12 to produce a prepreg. There was a tackiness difference between the fiber substrate surface and the resin surface in each prepreg, and it was shown that the handleability of the prepreg of Examples 9 to 12 was good. It was shown that the higher the complex viscosities η2*24 and η3*24, the lower the resin surface tackiness and the fiber substrate surface tackiness, respectively. In Examples 9 and 10, the fiber substrate surface tackiness was 0 mN/mm, and the prepreg had tackiness only on the resin surface, and the handleability was particularly preferable.

η2*70 and η13*70 of Examples 9 to 12 were both 100 to 5,000 Pa·s. η2*70 and η3*70 of Examples 10 to 12 were less than 500 Pa·s, and it was shown that the resin flow was large as compared with Example 9, but the resin amount loss in burrs and molding was small, and there was no problem. On the other hand, η2*70 and η*3 of Example 9 exceeded 500 Pa·s. It was shown that the prepreg of Example 9 is particularly preferable because the resin flow is small, and the resin amount loss in burrs and molding can be further suppressed.

In addition, it was shown that the prepreg of Examples 10 in which the value of η2*70 exceeded 500 Pa·s was better and more preferable in the process for producing the prepreg and the process passability of the obtained prepreg. The passability of the pre-cured resin film in the step was good in all Examples.

One surface of the prepreg described in Examples 9 to 12 was satisfactory because no resin was present or only a resin was partially present in the surface layer on the fiber substrate surface side, and no resin layer was present in the surface layer on the fiber substrate surface side.

Comparative Examples 1 and 2

In Comparative Examples 1 and 2, a thermosetting resin composition was prepared by applying 3,3'-diaminodiphenylsulfone as a curing agent to a thermosetting resin obtained by bisphenol A type epoxy alone or a mixture of bisphenol A type epoxy and tetraglycidyl diaminodiphenylmethane so as to produce a film-shaped resin material. In Comparative Example 1, when the added amount of the thermoplastic resin was 65 parts by mass, η1*70 of Comparative Example 1 exceeded 500 Pa·s, indicating that it was difficult to produce a high-quality film-shaped resin material because the thermosetting resin composition did not pass through a knife coater. Therefore, in Comparative Example 1, the film-shaped resin material was not pre-cured. In addition, the film-shaped resin material of Comparative Example 2 was stacked on one surface of the fiber substrate as it was without being pre-cured, and impregnated to prepare a prepreg. The viscosity of the thermosetting resin composition was adjusted by the addition amount of the thermoplastic resin.

η1*70 described in Comparative Example 2 was 500 Pa·s or less. A film-shaped resin material was produced at 70° C., and it was shown that the quality of the film-shaped resin material was good by visual observation and basis weight measurement.

It was shown that the resin flow of the prepreg in Comparative Example 2 exceeded 10 mass %.

Since the prepreg of Comparative Example 2 had excessive tackiness at the time of handling, the resin contained in the prepreg adhered to the hand or the workplace, and thus the handleability was poor. One surface of the prepreg described in Comparative Example 2, the entire surface of the fiber substrate surface was covered with the thermosetting resin composition, and the fiber substrate surface was poor.

Comparative Examples 3 and 4

In Comparative Examples 3 and 4, a thermosetting resin composition was prepared in which 3,4-epoxycyclohexanecarboxylic acid 3,4-epoxycyclohexylmethyl was used as a thermosetting resin, and benzylmethyl p-hydroxyphenylsulfonium hexafluoroantimonate was applied as a curing agent so as to produce a film-shaped resin material. However, $\eta 1^*70$ of Comparative Example 3 was less than 1 Pa·s, so that the thermosetting resin composition was not able to remain on the release paper, and a film-shaped resin material was not able to be produced. Therefore, in Comparative Example 3, the film-shaped resin material was not pre-cured. In addition, the film-shaped resin material of Comparative Example 4 was stacked on one surface of the fiber substrate as it was without being pre-cured, and impregnated to prepare a prepreg. The viscosity of the thermosetting resin composition was adjusted by the addition amount of the thermoplastic resin.

$\eta 1^*70$ of Example 4 was 500 Pa·s or less. In Comparative Example 4, a film-shaped resin material was produced at 70° C., and it was shown that the quality of the film-shaped resin material was good by visual observation and basis weight measurement. It was shown that the prepreg of Comparative Example 4 had a volatile amount exceeding 1 mass %.

In addition, since the prepreg of Comparative Example 4 had excessive tackiness at the time of handling, the resin contained in the prepreg adhered to the hand or the workplace, and thus the handleability was poor. One surface of the prepreg described in Comparative Example 4, the entire surface of the fiber substrate surface was covered with the thermosetting resin composition, and the fiber substrate surface was poor.

TABLE 1

| | | Example 1 | Example 2 | Example 3 | Example 4 |
|---|---|---|---|---|---|
| Thermosetting resin composition | Structural component [A]: Thermosetting resin (party by mass) | | | | |
| | Bisphenol A type epoxy ("jER" (registered trademark) 828 (manufactured by Mitsubishi Chemical Corporation). | 100 | 100 | 100 | 70 |
| | Tetraglycidyl diaminodiphenylmethane ("Araldite" (registered trademark) MY721, manufactured by Huntsman Corporation) | | | | 30 |
| | Component [B]: Curing agent of [A] (party by mass) | | | | |
| | 3,3'-diaminodiphenyl sulfone (3,3'-DAS, manufactured by Mitsui Fine Chemical, Inc.) | 30 | 30 | 30 | 30 |
| | Thermoplastic resin (party by mass) | | | | |
| | Polyethersulfone ("SUMIKAEXCEL" (registered trademark) PES5003P, manufactured by Sumitomo Chemical Co., Ltd.) | 10 | 20 | 30 | |
| Characteristics of thermosetting resin composition | $\eta 1^*70$ (Pa · s) | 11 | 52 | 103 | 21 |
| | $\eta 1^*24$ (Pa · s) | 2411 | 4876 | 12320 | 3465 |
| Film-shaped resin material | Quality of film-shaped resin material | Good | Good | Good | Good |
| Pre-curing conditions (Oven) | Temperature (° C.) | 90 | 90 | 90 | 90 |
| | Time (h) | 10 | 10 | 9 | 9 |
| Characteristics of pre-cured resin film | $\eta 2^*70$ (Pa · s) | 101 | 479 | 760 | 194 |
| | $\eta 2^*24$ (Pa · s) | 22229 | 44957 | 90922 | 31947 |
| Characteristics of prepreg | $\eta 3^*70$ (Pa · s) | 108 | 527 | 798 | 198 |
| | $\eta 3^*24$ (Pa · s) | 24007 | 49003 | 96377 | 32905 |
| | Resin flow (mass %) | 7.8 | 6.9 | 5.4 | 7.1 |
| | Volatile amount (mass %) | 0 | 0 | 0 | 0 |
| | Resin surface tackiness (mN/mm) | 9 | 3 | 1 | 5 |
| | Fiber substrate surface tackiness (mN/mm) | 4 | 2 | 0 | 3 |
| | Handleability | Good | Good | Good | Good |
| | Evaluation of impregnation result of prepreg | Good | Good | Good | Good |

| | | Example 5 | Example 6 | Example 7 | Example 8 |
|---|---|---|---|---|---|
| Thermosetting resin composition | Structural component [A]: Thermosetting resin (party by mass) | | | | |
| | Bisphenol A type epoxy ("jER" (registered trademark) 828 (manufactured by Mitsubishi Chemical Corporation). | 70 | 70 | 70 | 70 |

TABLE 1-continued

|  |  |  |  |  |  |
|---|---|---|---|---|---|
|  | Tetraglycidyl diaminodiphenylmethane ("Araldite" (registered trademark) MY721, manufactured by Huntsman Corporation) | 3 0 | 30 | 30 | 30 |
|  | Component [B]: Curing agent of [A] (party by mass) |  |  |  |  |
|  | 3,3'-diaminodiphenyl sulfone (3,3'-DAS, manufactured by Mitsui Fine Chemical, Inc.) | 30 | 30 | 30 | 30 |
|  | Thermoplastic resin (party by mass) |  |  |  |  |
|  | Polyethersulfone ("SUMIKAEXCEL" (registered trademark) PES5003P, manufactured by Sumitomo Chemical Co., Ltd.) | 5 | 10 | 10 | 10 |
| Characteristics of thermosetting resin composition | $\eta 1*70$ (Pa · s) | 67 | 129 | 129 | 129 |
|  | $\eta 1*24$ (Pa · s) | 7820 | 12201 | 12201 | 12201 |
| Film-shaped resin material | Quality of film-shaped resin material | Good | Good | Good | Good |
| Pre-curing conditions (Oven) | Temperature (° C.) | 90 | 90 | 90 | 80 |
|  | Time (h) | 10 | 3 | 9 | 24 |
| Characteristics of pre-cured resin film | $\eta 2*70$ (Pa ·s) | 618 | 272 | 952 | 876 |
|  | $\eta 2*24$ (Pa · s) | 72116 | 23755 | 90128 | 82824 |
| Characteristics of prepreg | $\eta 3*70$ (Pa · s) | 655 | 296 | 1066 | 955 |
|  | $\eta 3*24$ (Pa · s) | 75722 | 26368 | 97338 | 90278 |
|  | Resin flow (mass %) | 8.4 | 7.5 | 3.2 | 3.8 |
|  | Volatile amount (mass %) | 0 | 0 | 0 | 0 |
|  | Resin surface tackiness (mN/mm) | 3 | 8 | 1 | 1 |
|  | Fiber substrate surface tackiness (mN/mm) | 0 | 4 | 0 | 0 |
|  | Handleability | Good | Good | Good | Good |
|  | Evaluation of impregnation result of prepreg | Good | Good | Good | Good |

TABLE 2

|  |  | Example 9 | Example 10 | Example 11 | Example 12 |
|---|---|---|---|---|---|
| Thermosetting resin composition | Structural component [A]: Thermosetting resin (party by mass) |  |  |  |  |
|  | 3,4-epoxycyclohexanecarboxylic acid 3,4-epoxycyclohexylmethyl ("CELLOXIDE" (registered trademark) 2021P, manufactured by Daicel Corporation) | 100 | 100 | 100 | 100 |
|  | Component [B]: Curing agent of [A] (party by mass) |  |  |  |  |
|  | Benzylmethyl p-hydroxyphenylsulfonium hexafluoroantimonate ("SAN-AID (registered trademark)" SI-100, manufactured by Sanshin Chemical Industry Co., Ltd.) | 0.5 | 0.5 | 0.5 | 0.5 |
|  | Thermoplastic resin (party by mass) |  |  |  |  |
|  | Polyvinyl formal Polyvinyl formal ("VINYLEC" (registered trademark) K manufactured by JNC Corporation) | 10 | 20 | 30 | 40 |
| Characteristics of thermosetting resin composition | $\eta 1*70$ (Pa · s) | 1 | 20 | 67 | 201 |
|  | $\eta 1*24$ (Pa · s) | 25 | 2543 | 7230 | 16690 |
| Film-shaped resin material | Quality of film-shaped resin material | Good | Good | Good | Good |
| Pre-curing conditions (Oven) | Temperature (° C.) | 70 | 70 | 70 | 70 |
|  | Time (h) | 11 | 4 | 2 | 0.5 |
| Characteristics of pre-cured resin film | $\eta 2*70$ (Pa · s) | 1837 | 309 | 264 | 283 |
|  | $\eta 2*24$ (Pa · s) | 45925 | 37336 | 28452 | 23500 |
| Characteristics of prepreg | $\eta 3*70$ (Pa · s) | 2021 | 324 | 269 | 300 |
|  | $\eta 3*24$ (Pa · s) | 50058 | 39576 | 29306 | 24675 |
|  | Resin flow (mass %) | 2.8 | 3.6 | 4.1 | 4.1 |
|  | Volatile amount (mass %) | 0 | 0.2 | 0.8 | 0.8 |

TABLE 2-continued

|  |  | Example 9 | Example 10 | Example 11 | Example 12 |
|---|---|---|---|---|---|
|  | Resin surface tackiness (mN/mm) | 2 | 4 | 6 | 8 |
|  | Fiber substrate surface tackiness (mN/mm) | 0 | 0 | 3 | 4 |
|  | Handleability | Good | Good | Good | Good |
|  | Evaluation of impregnation result of prepreg | Good | Good | Good | Good |

TABLE 3

|  |  | Comparative Example 1 | Comparative Example 2 |
|---|---|---|---|
| Thermosetting resin composition | Structural component [A]: Thermosetting resin (party by mass) |  |  |
|  | Bisphenol A type epoxy ("jER" (registered trademark) 828 (manufactured by Mitsubishi Chemical Corporation). | 100 | 100 |
|  | Component [B]: Curing agent of [A] (party by mass) |  |  |
|  | 3,3'-diaminodiphenyl sulfone (3,3'-DAS, manufactured by Mitsui Fine Chemical, Inc.) | 30 | 30 |
|  | Thermoplastic resin (party by mass) |  |  |
|  | Polyethersulfone ("SUMIKAEXCEL" (registered trademark) PES5003P, manufactured by Sumitomo Chemical Co., Ltd.) | 65 | 10 |
| Characteristics of thermosetting resin composition | $\eta 1*70$ (Pa · s) | 648 | 11 |
|  | $\eta 1*24$ (Pa · s) | 87768 | 2411 |
| Film-shaped resin material | Quality of film-shaped resin material | Poor Not formed | Good |
| Pre-curing conditions (Oven) | Temperature (° C.) | — | Not performed |
|  | Time (h) | — | Not performed |
| Characteristics of prepreg | Resin flow (mass %) | — | 24.3 |
|  | Volatile amount (mass %) | — | 0.1 |
|  | Resin surface tackiness (mN/mm) | — | 29 |
|  | Fiber substrate surface tackiness (mN/mm) | — | 18 |
|  | Handleability | — | Poor |
|  | Evaluation of impregnation result of prepreg | — | Poor |

45

TABLE 4

|  |  | Comparative Example 3 | Comparative Example 4 |
|---|---|---|---|
| Thermosetting resin composition | Structural component [A]: Thermosetting resin (party by mass) |  |  |
|  | 3,4-epoxycyclohexanecarboxylic acid 3,4-epoxycyclohexylmethyl ("CELLOXIDE" (registered trademark) 2021P, manufactured by Daicel Corporation) | 100 | 100 |
|  | Component [B]: Curing agent of [A] (party by mass) |  |  |
|  | Benzylmethyl p-hydroxyphenylsulfonium hexafluoroantimonate ("SAN-AID (registered trademark)" SI-100, manufactured by Sanshin Chemical Industry Co., Ltd. ) | 0.5 | 0.5 |
|  | Thermoplastic resin (party by mass) |  |  |
|  | Polyvinyl formal Polyvinyl formal ("VINYLEC" (registered trademark) K manufactured by JNC Corporation) | 0 | 20 |

TABLE 4-continued

| | | Comparative Example 3 | Comparative Example 4 |
|---|---|---|---|
| Characteristics of thermosetting resin composition | η1*70 (Pa · s) | 0.01 | 20 |
| | η1*24 (Pa · s) | 1 | 2543 |
| Film-shaped resin material | Quality of film-shaped resin material | Poor Not formed | Good |
| Pre-curing conditions (Oven) | Temperature (° C.) | — | Not performed |
| | Time (h) | — | Not performed |
| Characteristics of prepreg | Resin flow (mass %) | — | 26.7 |
| | Volatile amount (mass %) | — | 5.8 |
| | Resin surface tackiness (mN/mm) | — | 29 |
| | Fiber substrate surface tackiness (mN/mm) | — | 24 |
| | Handleability | — | Poor |
| | Evaluation of impregnation result of prepreg | — | Poor |

The invention claimed is:

1. A prepreg comprising:
a fiber substrate; and
a resin layer containing a thermosetting resin composition containing at least components [A] and [B] below, stacked on one surface of the fiber substrate,
[A] thermosetting resin; and
[B] curing agent of [A]
wherein the fiber substrate is impregnated with a part of the thermosetting resin composition of the resin layer,
when a surface on a resin layer side of the prepreg is a resin surface and a surface on an opposite side is a fiber substrate surface, there is a difference between a tackiness force of the resin surface and a tackiness force of the fiber substrate surface,
the resin layer contained in the prepreg has a complex viscosity η3*24 at 24° C. of 20,000 to 100,000 Pa·s and a complex viscosity η3*70 at 70° C. of 100 to 5,000 Pa·s, and
a volatile amount of the thermosetting resin composition is 1 mass % or less when a total mass of the prepreg is 100 mass %.

2. The prepreg according to claim 1, wherein the fiber substrate surface has a tackiness force of 0 to 0.5 mN/mm, and the resin surface has a tackiness force of 1 to 15 mN/mm.

3. The prepreg according to claim 1, wherein the thermosetting resin composition further contains a component [C]
[C] thermoplastic resin
in an amount of 1 to 60 parts by mass with respect to 100 parts by mass of the component [A].

4. The prepreg according to claim 1, wherein the component [A] is an epoxy resin.

5. The prepreg according to claim 1, wherein the component [B] is a cationic curing agent.

6. The prepreg according to claim 1, wherein the η3*70 is 500 to 5,000 Pa·s.

7. The prepreg according to claim 1, wherein the fiber substrate is a nonwoven fabric.

8. The prepreg according to claim 1, wherein the fiber substrate is a woven fabric.

9. The prepreg according to claim 1, wherein a resin flow is 10 mass % or less with respect to 100 mass % of the prepreg.

10. The prepreg according to claim 1, wherein the resin layer containing a thermosetting resin composition is in a pre-cured form.

11. The prepreg according to claim 10, wherein the pre-cured resin layer is capable of crosslinking.

* * * * *